United States Patent [19]

Pfister

[11] Patent Number: 4,489,313

[45] Date of Patent: Dec. 18, 1984

[54] SIGNAL DIRECTION DETERMINING SYSTEM AND DIRECTIONAL LOOP ANTENNA ARRAY THEREFOR

[75] Inventor: Henry F. Pfister, Wilton Manors, Fla.

[73] Assignee: Sensormatic Electronics Corporation, Deerfield Beach, Fla.

[21] Appl. No.: 413,612

[22] Filed: Sep. 1, 1982

[51] Int. Cl.³ .............................................. G08B 21/00
[52] U.S. Cl. .................................... 340/540; 340/552; 340/572; 340/658; 343/742; 343/867
[58] Field of Search .............. 343/742, 867, 894, 442, 343/443, 448; 340/572, 552, 540, 657, 658, 674, 673

[56] References Cited

U.S. PATENT DOCUMENTS 2,657,313 10/1953 Antony ................................ 343/890
4,375,289 3/1983 Schmall et al. ..................... 340/572

Primary Examiner—Glen R. Swann, III
Attorney, Agent, or Firm—Hopgood, Calimafde, Kalil, Blaustein & Judlowe

[57] ABSTRACT

A directional loop antenna array is provided by two flat parallel spaced apart open loops with a shorted turn disposed between the open loops equidistant therefrom. The signals from the open loops are vectorially added and subtracted in a sum and difference circuit and the phase angle between the sum and difference signals is ascertained in a phase detector circuit that feeds an indicator. The so determined phase angle is either greater or less than 90° depending upon the relative magnitudes of the loop signals.

10 Claims, 8 Drawing Figures

SIGNAL DIRECTION DETERMINING SYSTEM AND DIRECTIONAL LOOP ANTENNA ARRAY THEREFOR

BACKGROUND OF THE INVENTION

The present invention relates to signal direction determining apparatus and, more particularly, to apparatus for providing an output indicative of the direction to a source of AC signals.

In the copending application of Raymond L. Barrett, Jr., Ser. No. 354,156, filed Mar. 5, 1982, for Randomized Tag to Portal Communication System, and assigned to the same assignee as the present application, there is described a system whereby the whereabouts of personnel in a hospital or other facility is determined and stored through the interaction of identification tags and portal interrogating stations. Each individual to be monitored is provided with a unique identification tag, and each portal is provided with an encircling magnetic loop and associated circuitry for establishing communication with any tags that come within range. As described in said application, the portals are provided with single loops and infer that each time a tag comes within range it passes through. Although physical constraints can be applied to doorways and passageways so as to minimize detection of a tag unless it is being carried through, the need for such constraint is undesirable and individuals do, on occasion, change their mind. Preferably, the system should be direction sensitive so as to recognize on which side of the portal a tag is located regardless of prior history.

It is, therefore, an object of the present invention to provide a practical and functional directional loop antenna array, and system therefor, whereby the direction to a signal source can be ascertained independent of the past history of such source.

SUMMARY OF THE INVENTION

In accordance with one aspect of the present invention there is provided a signal direction determining system for providing an output indicative of the direction to a source of AC signals from a directional loop antenna array where said array includes at least a pair of open loops of electrically conductive material, said system comprising means coupled to said open loops for providing a first output corresponding to the sum of any AC signals induced in said loops by said source and a second output corresponding to the difference between said induced signals; and phase detecting and indicating means coupled to said first and second outputs for providing a further output dependent upon which open loop has the greater induced signal, said further output being indicative of the direction to said source.

In accordance with a further aspect of the present invention there is provided a directional loop antenna array comprising at least one closed loop of electrically conductive material located between a pair of open loops of electrically conductive material, said open loops each having means for effecting coupling thereto of a utilization device.

BRIEF DESCRIPTION OF THE DRAWINGS

The invention will be better understood after reading the following detailed description of the presently preferred embodiments thereof with reference to the appended drawings in which.

The same reference numerals are used throughout the drawings to designate the same or similar parts.

DETAILED DESCRIPTION OF THE PREFERRED EMBODIMENTS

Figure 1:
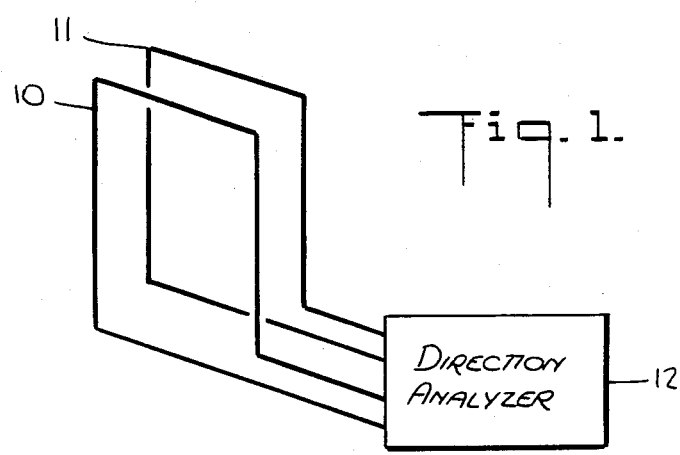
FIG. 1 is a schematic diagram of an antenna array coupled to a direction analyzer illustrative of the subject system.

Referring now to FIG. 1, there is shown a pair of open loops 10 and 11, each connected to a direction analyzer 12. For the purpose of the present discussion it should be assumed that loops 10 and 11 are essentially flat, of any shape including the rectangular configuration illustrated, of any suitable number of turns, substantially identical electrically, and are to be used in a communication system wherein a signal originating from either side of the plane of each loop is capable of inducing a net signal in each loop. Therefore, except for the singular case where the signal originates from a point lying in the plane that is equidistant from, parallel to, and between the planes of loops 10 and 11, the signal amplitude induced in loops 10 and 11 will be unequal. It is this inequality that is utilized to determine on which side of the loops 10 and 11 the source is located. The signal inequality arises as a consequence of the attenuation of a signal with distance of travel. Of course, the magnitude of the inequality will be a function of the spacing between loops 10 and 11, the frequency of the signal, any lack of equality in the nature of the transmission paths to the respective loops, and the particular location of the signal source.

An antenna array of the type shown in FIG. 1 has many uses. Obviously, it can be used in direction finding. A particular use that is contemplated at present is in a monitoring and tracking system of the type described in said Barrett application. In such system the loops 10 and 11 would be located on opposite sides of a doorway around the door frame and the identification tags that provide the signal sources would be carried through the loops in either direction. The problem is to increase the sensitivity whereby the system senses which loop, 10 or 11, is receiving the stronger signal even though the differences in magnitude are not very great.

Figure 2:
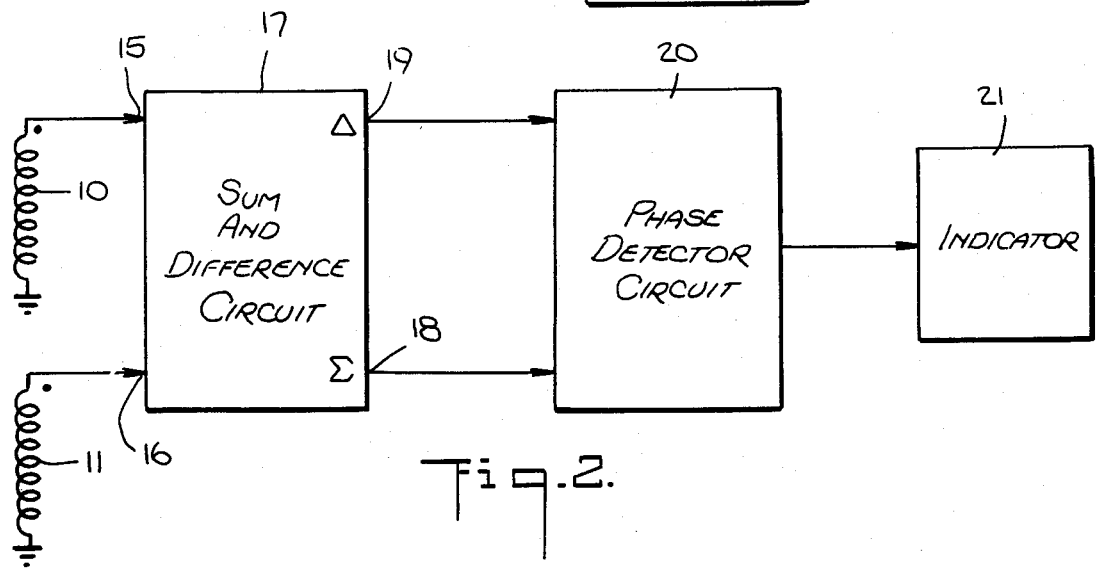
FIG. 2 is a block diagram of one embodiment of the system.

Reference should now be had to FIG. 2 wherein there is illustrated a system for accomplishing the signal resolution necessary for reliable direction determination with the two loops, 10 and 11, of FIG. 1. The loops 10 and 11 are connected between ground and respective input terminals 15 and 16 of a sum and difference circuit 17. The circuit 17 has two outputs, 18 and 19, that furnish signals corresponding, respectively, to the vector sum and vector difference of the signals appearing in loops 10 and 11 related to ground as a point of reference potential. The signals at outputs 18 and 19 are conveniently referred to as the "sum" and "difference" signals and these are fed to inputs of a phase detector circuit 20 whose output is furnished to an indicator 21.

Figure 7:
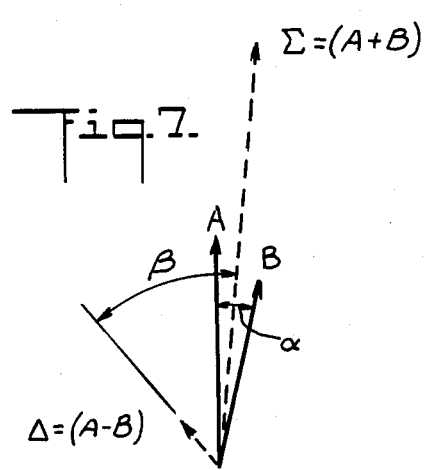
FIG. 7 is a vector diagram useful in explaining the general operation of the system of the invention.

The operation of the circuit of FIG. 2 can best be described with reference to FIG. 7 which contains a vector diagram illustrative of the general case. Assume that the signal source is operating at some convenient frequency which can be anywhere from very low frequency, in the VLF band, to medium frequencies in the MF band. The signal source acts as the primary of a transformer radiating a time varying magnetic field that couples to the loops 10 and 11 acting as the transformer secondaries. Voltages are thereby induced in loops 10 and 11 in known manner.

Assume that the signal induced in loop 10 is represented by vector A and that the signal induced in loop 11 is represented by vector B, both in solid lines. As a consequence of the operating frequency, tuning errors, and the relationship of the signal wavelength to the spacing of the loops from each other, the signal in loop 11 may not be quite in phase with the signal in loop 10. The departure from phase coincidence is denoted by the angle $\alpha$. While such phase angle can usually be kept to a sufficiently small value to be ignored, it has been exaggerated in FIG. 7 for the sake of clarity while explaining the general case.

Obtaining the vector sum and difference of the vectors A and B produces a sum vector $\Sigma = (A+B)$ and a difference vector $\Delta = (A-B)$, both as shown. The vector $\Sigma$ makes an angle $\ominus$ with respect to the vector $\Delta$ and it is the magnitude of the angle $\beta$ that is ascertained by the phase detector 20 and which controls the indicator 21. It should be apparent from a consideration of FIG. 7 that when $\alpha > 0$, $\beta = 90°$ when $A = B$, and when $A \neq B$, $\beta$ is either greater or less than 90° depending upon whether vector B is greater or less than vector A, respectively. Analysis of the vector diagram will reveal that the change in magnitude of angle $\beta$ is very rapid with change in the relative magnitudes of vectors A and B and that such change in angle $\beta$ is greater as $\alpha$ becomes smaller. For the limiting case of $\alpha = 0$, $\beta$ is either 0° or 180°.

Figure 3:
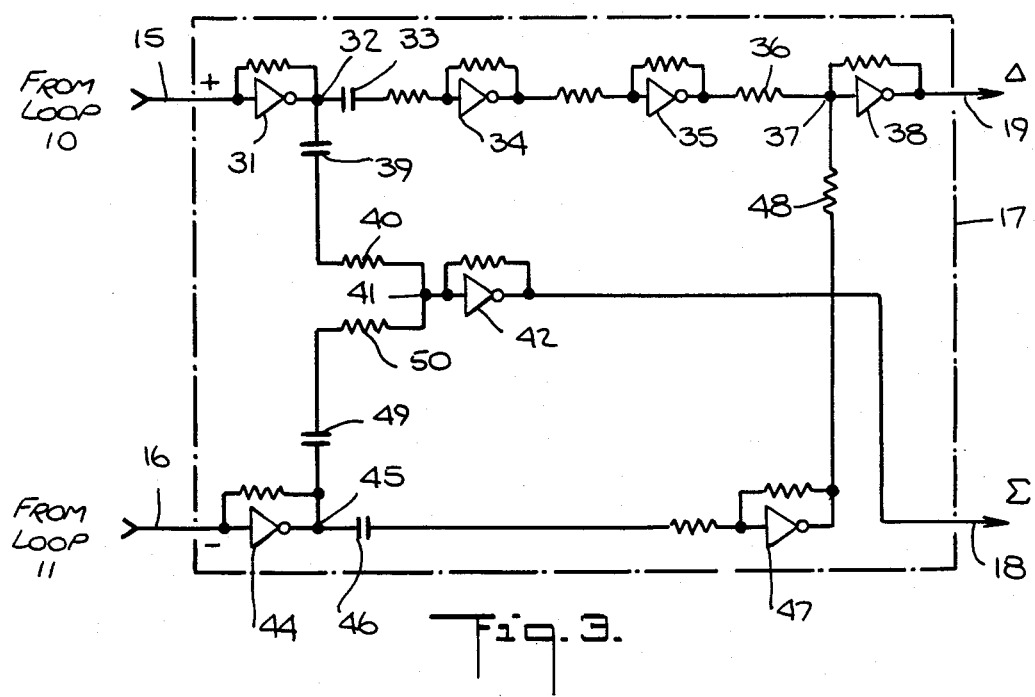
FIG. 3 is a detailed schematic diagram of the sum and difference circuit employed in the system of FIG. 2.

While the sum and difference circuit 17, the phase detector 20, and the indicator 21 can be implemented in any known manner, it is presently preferred to construct the sum and difference circuit 17 as shown in FIG. 3 to which attention should now be directed. The input terminal 15, coupled to loop 10, is connected to the input of a unity or fixed gain inverting amplifier 31 whose output at junction 32 is connected through a coupling capacitor 33 to a series of two resistance coupled inverting amplifiers 34 and 35, also of unity or fixed gain. The output of amplifier 35 is connected through a summing resistor 36 to a junction 37 connected to the input of another unity or fixed gain inverting amplifier 38. The output of amplifier 38 is connected to output terminal 19, the difference output. Junction 32 is also connected through a coupling capacitor 39 and a summing resistor 40 to a junction 41 that is connected through a resistance coupled unity or fixed gain inverting amplifier 42 to output terminal 18, the sum output.

Input terminal 16 is connected to junction 37 through an inverting amplifier 44 of unity or fixed gain, an output junction 45, a coupling capacitor 46, a unity or fixed gain inverting amplifier 47 and a summing resistor 48. Junction 45 is also connected through a coupling capacitor 49 and a summing resistor 50 to junction 41. The gain of amplifiers 31 and 44 should be equal while the total gain of the two amplifiers 34 and 35 should equal the gain of amplifier 47. Also, the impedance loading between junctions 32 and 37 should be the same as that between junctions 45 and 37. Conveniently, amplifiers 34, 35 and 47 can have unity gain.

Figure 8:
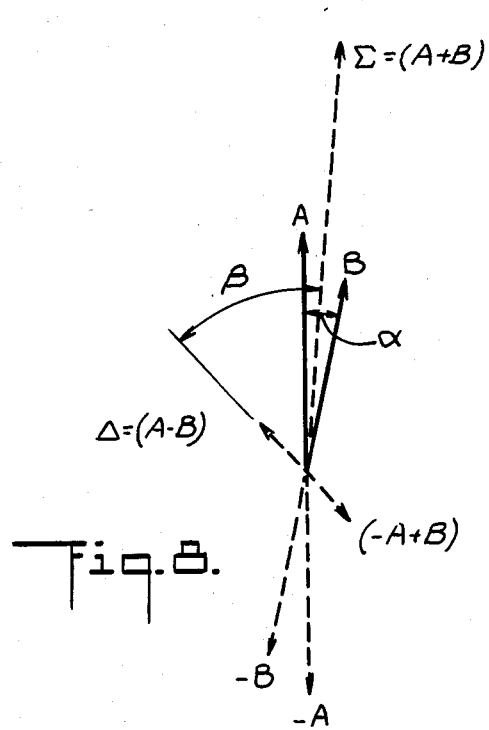
FIG. 8 is a vector diagram for explaining the operation of the specific embodiment of FIG. 3.

The operation of the circuit of FIG. 3 will now be described with the aid of the vector diagram in FIG. 8. Thus, assuming arbitrarily that vectors A and B represent the signals at the input of terminals 15 and 16, similar to that already described with reference to FIG. 7, the signals at junctions 32 and 45 will be represented, respectively, by the vectors $-A$ and $-B$. The summation of the last two signals at junction 41, after inversion by amplifier 42, will be represented by the vector $\Sigma = (A+B)$. This same vector represents the output signal at terminal 18.

The signal appearing at junction 32, represented by vector $-A$, will also appear at junction 37, and assuming unity gain for amplifiers 34 and 35, will be represented by the same vector $-A$. However, a signal at junction 45 and represented by vector $-B$ passes through only the single inverting amplifier 47 such that it appears at junction 37 with a phase reversal. If amplifier 47 has unity gain, the signal furnished to junction 37 will be represented by vector B. Summing the signal from amplifier 47 with that from amplifier 35 will yield a signal represented at junction 37 by vector $(-A+B)$ which, after inversion in amplifier 38 and assuming unity gain, appears at terminal 19 as represented by the vector $\Delta = (A-B)$. The angles $\alpha$ and $\beta$ in FIG. 8 have the same significance as in FIG. 7.

The signals furnished by the circuit of FIG. 3 can be supplied to any known phase detecting and indicating circuit capable of providing in known manner an output indication that is a function of the angle $\beta$ and indicative of the direction to the signal source.

Figure 4:
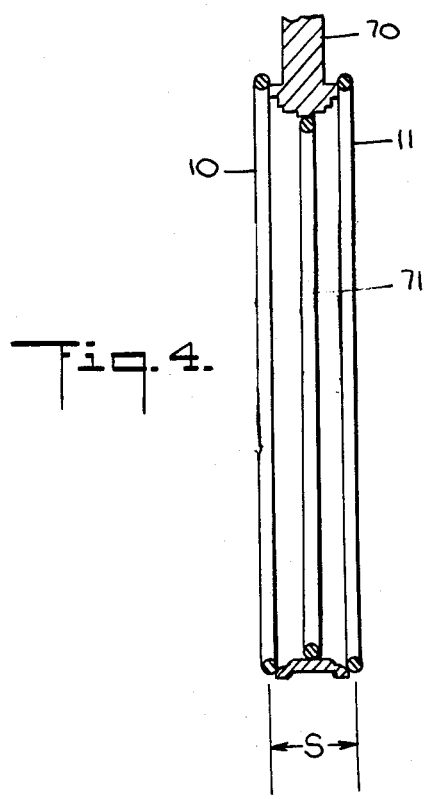
FIG. 4 is a vertical sectional view through a doorway furnished with an antenna array in accordance with the invention.
Figure 6:
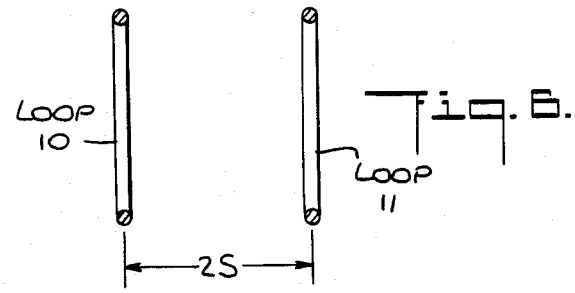
FIG. 6 is a diagrammatic view for explaining a further characteristic of the antenna array.
Figure 5:
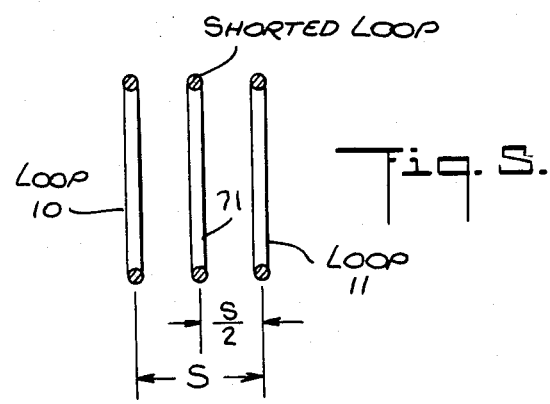
FIG. 5 is a diagrammatic view for explaining an operating characteristic of the array of FIG. 4.

Of considerable importance to the success of the subject invention is the realization of the loop antenna array that enables it to be adapted to the environment where it will be used. In FIG. 4 there is shown a doorway or door frame 70 having loops 10 and 11 mounted on opposite sides thereof, preferably substantially congruent, each of flat construction, and in parallel coaxial relationship. If we stop at that point, we have an assembly in which the difference in amplitude of signals received by the loops from a source off to one side will be a direct function of the spacing between the loops. When the spacing between the loops is slight such as in the doorway example of FIG. 4, the difference in signal amplitude received from a source is small and hard to detect. Considerable improvement has been achieved by locating a shorted turn or closed loop 71 between the loops 10 and 11 as shown in FIG. 4. The closed loop functions as a shield for isolating loops 10 and 11 from each other. Experimentation has shown that two loops, say 10 and 11, with a closed loop 71 between them as shown in FIG. 5 and at a distance S/2 from the loops 10 and 11 where S is the distance between loops 10 and 11, develops the same results in the difference channel as two loops without a closed loop therebetween but separated twice the distance, i.e., 2S. See FIG. 6. The maximum difference between signal levels received by the respective loops will occur for a signal from the same position, but with a greater difference in magnitude when the closed loop is present.

It has been discovered that when the loops 10 and 11 are secured to a door frame of metal and isolated from the door frame, the frame itself functions as a closed loop or shorted turn such that an additional closed wire loop is not needed.

The foregoing description has been directed to use of the loops for signal reception. While the direction determining function is not applicable to transmission, the benefits derived from the inclusion of a shorted turn as described with reference to FIGS. 4 and 6 can be obtained in a signal transmitting mode. That is, the intermediate closed loop tends to direct the signals from each open loop towards its side of the antenna array.

Having described the present invention with reference to the presently preferred embodiments thereof, it will be apparent to those skilled in the subject art that various changes in construction can be incorporated without departing from the true spirit of the invention as defined in the appended claims.

What is claimed is:

1. A signal direction determining system for providing an output indicative of the direction to a source of AC signals from a directional loop antenna array where said array includes at least a pair of open loops of electrically conductive material, said system comprising means coupled to said open loops for providing a first output corresponding to the sum of any AC signals induced in said loops by said source and a second output corresponding to the difference between said induced signals; and phase detecting and indicating means coupled to said first and second outputs for providing a further output dependent upon which open loop has the greater induced signal, said further output being indicative of the direction to said source.

2. A signal direction determining system according to claim 1, wherein at least one closed loop of electrically conductive material is located between said pair of open loops.

3. A signal direction determining system according to claim 2, wherein said open loops are substantially congruent, each of flat construction, and in parallel coaxial relationship one to the other.

4. A signal direction determining system according to claim 3, wherein said closed loop consists of a metal door frame, and said open loops are disposed on opposite sides of said frame.

5. A signal direction determining system according to claim 3, wherein said closed loop consists of at least one shorted turn.

6. A directional loop antenna array comprising at least one closed loop of electrically conductive material located between a pair of open loops of electrically conductive material, said open loops each having means for effecting coupling thereto of a utilization device.

7. A directional loop antenna array according to claim 6, wherein said open loops are substantially congruent, each of flat construction, and in parallel coaxial relationship one to the other.

8. A directional loop antenna array according to claim 7, wherein said closed loop consists of a metal door frame, and said open loops are disposed in opposite sides of said frame.

9. A directional loop antenna array according to claim 7, wherein said closed loop consists of at least one shorted turn.

10. A directional loop antenna array according to claim 9, wherein said closed loop is spaced between parallel to and equidistant from said open loops.

* * * * *